United States Patent [19]

Duer

[11] Patent Number: 5,727,593
[45] Date of Patent: Mar. 17, 1998

[54] TIDE GATE VALVE WITH CURVILINEAR BILL

[75] Inventor: Michael Duer, Pittsburgh, Pa.

[73] Assignee: Red Valve Company, Inc., Carnegie, Pa.

[21] Appl. No.: 669,755

[22] Filed: Jun. 26, 1996

[51] Int. Cl.$^6$ .................................................. F16K 15/14
[52] U.S. Cl. ........................ 137/846; 137/847; 137/850
[58] Field of Search ............................. 137/846, 847, 137/850, 849, 848, 844, 843

[56] References Cited

U.S. PATENT DOCUMENTS

| | | | |
|---|---|---|---|
| 171,817 | 1/1876 | Kahl | 137/847 |
| 194,329 | 8/1877 | Buhrer | 137/846 |
| 298,208 | 5/1884 | Irving | 137/846 |
| 3,118,468 | 1/1964 | Bochan | 137/846 |
| 3,422,844 | 1/1969 | Grise | 137/846 |
| 4,163,509 | 8/1979 | Amneus | 137/846 |
| 4,492,253 | 1/1985 | Raftis | 137/849 |
| 4,501,374 | 2/1985 | Robertson | 137/846 X |
| 4,585,031 | 4/1986 | Raftis et al. | 137/846 |
| 4,607,663 | 8/1986 | Raftis et al. | 137/846 |
| 4,828,554 | 5/1989 | Griffin | 137/846 X |
| 5,330,437 | 7/1994 | Durman | 137/846 |

*Primary Examiner*—Denise L. Ferensic
*Assistant Examiner*—Joanne Y. Kim
*Attorney, Agent, or Firm*—Webb Ziesenheim Bruening Logsdon Orkin & Hanson, P.C.

[57] ABSTRACT

An inversion-resistant check valve or tide gate valve has a sleeve bounding a longitudinally extending, flow-through passage for fluids. The sleeve has an intermediate region and an upstream fluid inlet end region mountable on a discharge end of a conduit which is elongated along a longitudinal first axis of symmetry. The sleeve also has a downstream fluid outlet end region comprised of two or more thin and flexible lips which are opposed to each other and which are preformed to define a bill which is curvilinear. The lips are thinner and more flexible than the intermediate region. The curvilinear bill ensures sealing of the thinner, more flexible lips, allows easier opening of the valve, and reduces the likelihood of gapping in the lips. Unwanted backflow through the check valve is thereby prevented.

25 Claims, 4 Drawing Sheets

TIDE GATE VALVE WITH CURVILINEAR BILL

BACKGROUND OF THE INVENTION

1. Field of the Invention

This invention generally relates to check valves and, more particularly, to tide gate valves.

2. Description of the Prior Art

A check valve is essentially a valve which allows fluid flow in only one direction through a conduit, while closing and preventing back or reverse flow, when back pressure builds up downstream of the valve to a level greater than the upstream fluid pressure head.

One example where the fluid backflow problem is especially acute is where such valves are used to handle raw sewage, sewer effluent and storm water. Virtually all municipalities near waterways have storm and sewer lines which empty into the waterways. When there is a storm, storm water from the streets runs into and through these sewer pipes and flows into the waterways. Sewage treatment plants discharge raw or treated sewage into the waterways. When the tide is in, these sewer pipes back fill with the water from the waterway. This leaves little or no storage capacity in the sewer pipes. In the event there is a large cloudburst or storm during the time that the tide is in, all or a portion of the storm water cannot get in the sewer because the sewer pipes are at least partially filled. This causes street flooding.

Another example where the fluid backflow problem is especially acute is where the check valves are used in chemical plants or municipal waste treatment plants. In such applications, it is desired to permit waste water or treatment chemicals to enter a reaction vessel or pond from a storage container without permitting the contents of the reaction vessel to backflow into the storage container as the chemical reactions proceed.

To deal with the backflow problem, particularly to prevent street flooding by storm sewers, various types of tide gate valves have been proposed. One type consists of a wooden gate which floats up when the tide comes in, thereby closing the tide gate valve to prevent the sewer pipes from filling with the tide water. When the tide goes out, the wooden gate sinks, thereby opening the tide gate valve. Another type consists of a mechanical tide gate valve made of steel. This type is subject to corrosion, which adversely affects its operation. Spring-loaded valves having several moving parts also have been proposed but are unreliable in operation. Many of these prior art valves jam in the open position or otherwise fail to open or close when required. Noise, slamming or chatter are frequently prevalent with such types of check valves. Sliding, rotating, swinging and plunging parts lead to wear and failure or jamming, especially when handling slurries or other fluids containing entrained particulate solid material. Such previously proposed tide gate valves are also subject to jamming when trees, logs, bricks and the like get into the valves and prevent the gates from fully closing.

One check valve which has been developed in recent years is the duck-bill, sleeve-type check valve. Such a valve entails a flexible, resilient sleeve which has a cuff or a flange, a tapered intermediate portion or "saddle", and a duck-bill outlet end which opens to an oval shape to accommodate successively greater fluid flow, but which closes on back pressure buildup.

One problem with such valves is that when a high back pressure is encountered, the saddle area is compressed inward so that the valve's lips are prone to gap open and/or collapse and invert, thus permitting an undesirable backflow of fluid. This problem is intensified for large size valves on the order of twenty-four inches or even greater diameter, because the larger the diameter of the valve, the larger the area of the saddle and, in such cases, even a relatively low back pressure will provide sufficient force to compress the saddle and gap open or collapse and invert the valve's lips.

The lips forming the bill on the prior art valves are relatively thick, matching the thickness of the walls in the saddle or main body portion of the valve. The thicker bill of the prior art produces two detrimental effects. One, it is very difficult to get the bill lips to bend in the middle while opening. It is like trying to bend two 2×4 pieces of wood. Second, since the bill is so thick, it produces a restriction at the top and bottom of the bill, which reduces the open area at a given differential pressure between the interior and exterior of the valve. It is difficult for the valve lips to pry apart in these locations since there is so much material and a good deal of stiffness. These two effects greatly contribute to an increase in headloss through the valve, which is generally undesirable.

As back pressure increases on the prior art check valve, the saddle begins to deform inward. In doing so, the sealing area of the valve moves from the bill back into the saddle during high back pressure. This saddle deformation has tended to gap open the thicker, straight bill and occasionally develop leakage if the sealing area in the saddle is not adequate.

Thus, if one constructs the valve, including the saddle and bill, with rigid materials, the valve may resist inversion and sagging, but at the expense of making the valve much tougher to open. The reverse situation also is true. That is, if one constructs the saddle and bill having the straight bill configuration of the prior art with very flexible materials, the valve will open easily, but it may not resist inversion.

The reason a deforming saddle in the prior art will gap open the bill is because there is no "stiffness break" between the saddle and bill. Prior art unibody construction has a thick, uniform wall thickness from the cuff to the saddle to the bill. The load induced in the saddle by back pressure, for example when the tide rises over the valve, or by sagging due to the weight of the valve, is transferred via a fulcrum effect to the bill which causes the bill to gap open.

Still another design problem with the tide gate valve concerns gapping after outflow. Over time, long periods of outflow, i.e., where the lips of the valve open to discharge fluid from the valve, can cause the lips to gap open. Gaps large enough to provide a backflow of roughly fifty gallons/minute have been observed on a forty-eight inch tide gate valve. The backflow caused by a rising tide can force this gap to open further, thereby allowing tidal water to penetrate the valve, defeating the purpose of the valve.

Improved tide gate valves are disclosed in U.S. Pat. Nos. 4,492,253; 4,585,031 and 4,607,663.

A need remains in the art for a duck-bill, sleeve-type check valve or tide gate valve which will open with a very low headloss, or pressure drop, across the valve, wherein the bill of the valve can be made of thin and flexible materials, yet where the bill and the saddle retain the ability to resist inversion or gapping during periods of high back pressure and to resist gapping after long periods of outflow.

It has been found desirable to provide a "stiffness break" between the saddle and the bill. If the saddle wall is thick and the bill wall is thin, this would prevent deformation in the saddle from being transferred to the bill. If the saddle and bill were independent, the saddle could be made rigid and stiff to handle higher back pressures while maintaining ease of opening.

SUMMARY OF THE INVENTION

It is a general object of this invention to provide a reliable, improved tide gate valve which resists inversion and which resists gapping, but which nevertheless opens readily when subjected to low outflow pressures.

It is another object of this invention to provide a tide gate valve with a pair of thin, flexible valve lips which are pre-formed to define a curved bill, so that the saddle may be stiffened to prevent inversion and backflow through gapping while permitting the valve to open more fully and readily than the prior art with a minimum pressure head.

In keeping with these objects and others which will become apparent hereinafter, one feature of this invention resides, briefly stated, in an inversion-resistant tide gate valve which comprises a sleeve made of an elastomeric material and bounding a longitudinally extending, flow-through passage for fluids. The sleeve has an intermediate region, also known as a "saddle", which is associated at a first upstream end with an upstream fluid inlet region, comprising a "cuff" or "flange", mountable on a discharge end of a conduit which is elongated along a longitudinal first axis of symmetry. The intermediate region at the downstream end has a fluid outlet region comprised of two lips which are opposed to each other and which are pre-formed to define a curvilinear bill. The curvilinear bill functions to seal the valve lips and to prevent gapping of the lips. The lips are preferably formed of one layer of an unreinforced elastomer material, one layer of a reinforced elastomer material and a cover. The lips are preferably pre-formed by vulcanization to form a C-shaped bill. Since the ends of the lips are preferably directed away from the force of the rising tide by the curved bill, and since the curve imparts a positive inner seal on the lips, the lips will not be forced open, even if there is gapping in the lips due to extended outflow conditions.

The lips are relatively less stiff than the saddle. Since the lips are thin and flexible, they are easily movable from a closed curved-bill position, in which the lips sealingly engage each other, to an open position in which the lips are located apart from each other and the bill is relatively straighter. The lips open in response to a minimal pressure head within the passage and exerted in a direction downstream of the passage. Since the lips are not as stiff as the saddle, deformation on the saddle due to back pressure or weight sag cannot be transferred to the lips to cause undesirable gapping.

According to the invention, the saddle functions to resist inversion. Since the lips are relatively thin, flexible and curvilinear, the saddle's stiffness can be varied to handle increasing back pressure with little or no effect on headloss or ease of opening.

The novel features of the invention are set forth in detail in the appended claims. The invention itself, however, both as to its construction and its method of operation, together with additional objects and advantages thereof, best will be understood from the following description of specific embodiments when read in connection with the accompanying drawings.

DETAILED DESCRIPTION OF THE PREFERRED EMBODIMENTS

Check valves according to the present invention have been known in the art by several terms, including "tide gate valves" and "duck-bill, sleeve-type check valves". In this detailed description of the preferred embodiments, the term "tide gate valve" will generally be used, but it is to be understood that this is only one of several synonymous terms for the same type of valve.

Figure 1:
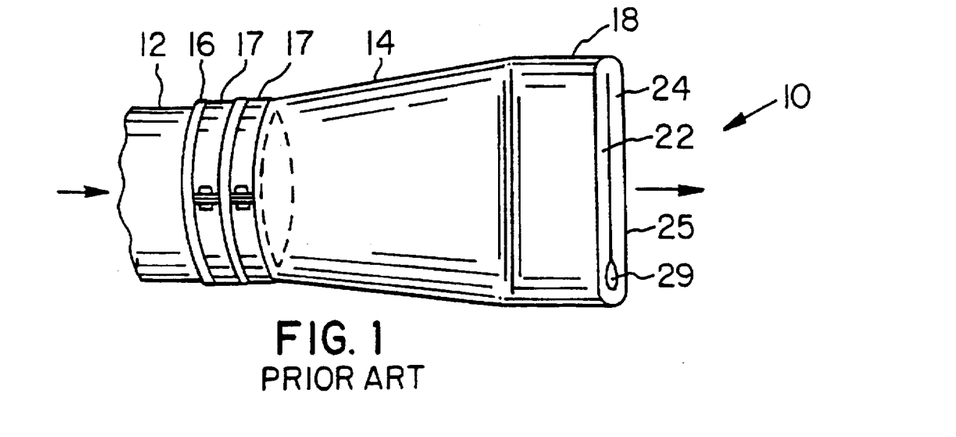
FIG. 1 is a perspective view of a prior art tide gate valve showing gapping of the lips after extended use.

Referring now to FIG. 1, a prior art tide gate valve 10 is shown mounted at a discharge end of a conduit 12, shown in dashed line, from which fluids are discharged. The conduit 12 may be a storm sewer, an industrial waste pipe, or any pipe which discharges an effluent into a river, creek, ocean or analogous waterway or a chemical reaction vessel or any vessel known in the art where it is desired to discharge a fluid while preventing backflow into the conduit 12.

The valve 10 generally comprises a sleeve, which bounds a longitudinally extending, flow-through passage for the effluent which may be a liquid or slurry, such as raw sewage, storm rain water, sludge, chemical slurry, scum paper stock, tailings slurry, or any industrial waste. More specifically, the sleeve has an intermediate region 14, also known as a "saddle" which is associated at a first upstream end with a generally cylindrical upstream fluid inlet region 16, also known as a "cuff", mounted on and around the discharge end of conduit 12. Fluid inlet region 16 may be secured to conduit 12 by any devices commonly known in the art such as bands, clamps, etc. Clamps 17 are shown in FIG. 1. Intermediate region 14 can be cylindrical, but in most applications it is slightly tapered. It is shown in the drawings of the present invention in a tapered embodiment.

The intermediate region 14 is associated at a downstream end with a fluid outlet region 18. Fluid outlet region 18 is more specifically comprised of lips 22 and 24. Together, the lips form a bill 25. The lips 22 and 24 have planar mating surfaces facing and opposed to each other. The lips 22 and 24 of the prior art extend longitudinally over the entire length of fluid outlet region 18, which is a distance generally equal to about one-half of the diameter of conduit 12. Generally conduit 12, when used in storm or sewer water applications has a large diameter in the range of twelve inches to forty-eight inches or more. However, in some applications, as for example, in chemical reaction vessels, the diameter of conduit 12 can be on the order of a few inches. The invention applies to all sizes of tide gate valves.

Inversion of prior art valve 10 in response to back pressure is prevented by one of the following designs. The valve sleeve can be comprised of at least three converging sides with embedded reinforcing elements in the sleeve as described in U.S. Pat. No. 4,492,253. Alternatively, the valve can be designed with a multiple-ply sleeve having a rigid support member embedded therein as described in U.S. Pat. No. 4,585,031. Finally, a series of strengthening pads can be formed as part of the lips 22 and 24 and the valve sleeve as described in U.S. Pat. No. 4,607,663. To the extent necessary to define the present invention, U.S. Pat. Nos. 4,492,253, 4,585,031 and 4,607,663 are incorporated herein by reference. The tide gate valves of the prior art typically have a uniform wall thickness in all portions of the valve, the lips being thick and stiff.

Figure 2:
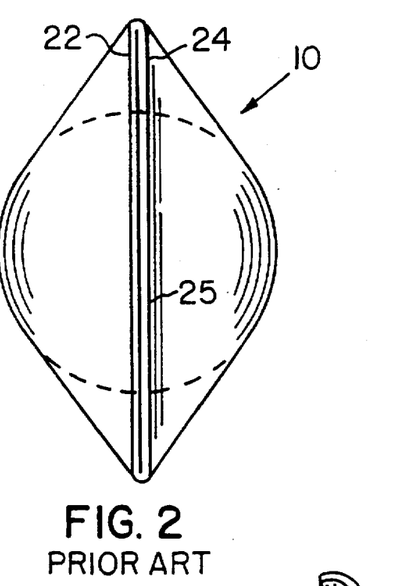
FIG. 2 is an end view of another prior art tide gate valve having thick lips in the closed position.
Figure 3:
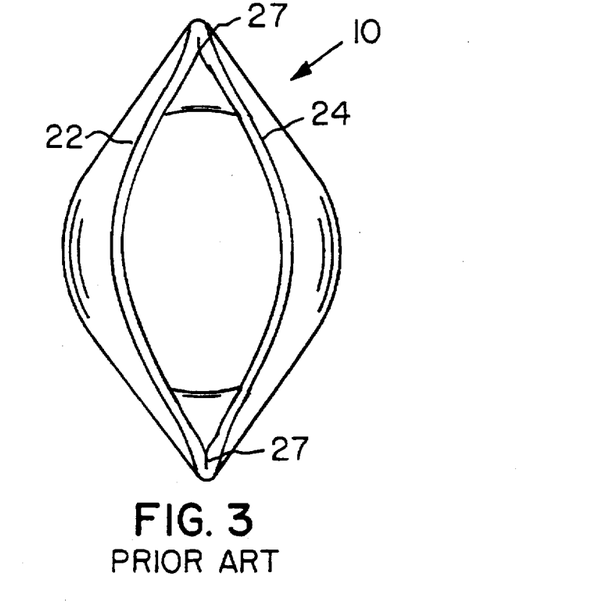
FIG. 3 is an end view of the prior art tide gate valve of FIG. 2 in the open position.
Figure 17:
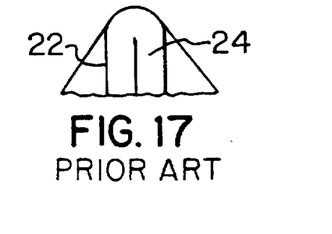
FIG. 17 is an end view, partially broken away, showing relatively thick lips on the upper portion of a prior art bill in the closed position.
Figure 18:
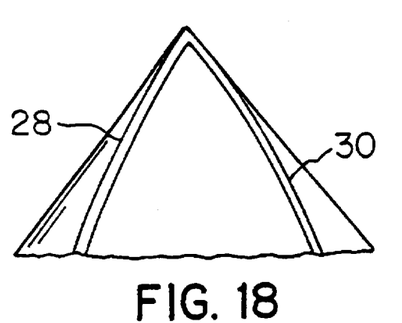
FIG. 18 is an end view, partially broken away, showing the bill and relatively thin lips of FIG. 16 in the full open position.
Figure 19:
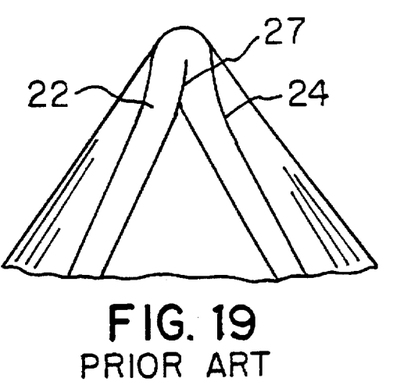
FIG. 19 is an end view, partially broken away, of the prior art bill of FIG. 17 showing thicker lips causing a restriction upon the opening of the bill.

Additional views of the tide gate valve according to the prior art are shown in FIGS. 2 and 3. FIG. 2 is an end view of a tide gate valve according to the prior art, showing relatively thick lips 22 and 24 in a closed position. For example, on a typical tide gate valve according to the prior art wherein the cuff or fluid inlet region 16 is sized to fit on a forty-eight inch conduit, the lips 22 and 24 would each have a thickness of about 1½ inches. FIG. 3 shows a tide gate valve of FIG. 2 in the open position. Importantly, due to the relative thickness of lips 22 and 24, the lips 22 and 24 generally are not able to fully open, even at typical maximum outflow pressures. As a result of stiffness in the thicker lips 22 and 24, restrictions 27 at the upper and lower ends of lips 22 and 24 are present, wherein the lips 22 and 24 are still in sealing engagement with one another. Attention is directed to FIGS. 17 and 19 wherein an upper portion of the tide gate valve 10 is shown in isolation, illustrating the restriction problem. The restriction 27 adds headloss to the system in which the valve 10 is incorporated so that more energy is required to open the valve 10 and discharge the effluent.

Referring back to FIG. 1, after long periods of high outflow, wherein the lips 22 and 24 are held in the open position, a problem has been encountered on certain prior art tide gate valves. Particularly, a gap 29 has been seen to develop, whereby the lips are no longer able to seal and engage themselves, since their resiliency is lost due to their extended period in the outflow position. The relative thickness of lips 22 and 24 tends to make them stiff and less resilient so that they may be stubborn to return to the sealing engagement position after long periods of outflow in the open position. Gaps can develop over nearly the entire length of the bill. This gapping is pried open further during periods of tidal backflow so that, eventually, backflow enters the tide gate valve 10 and defeats the valve's purpose. This problem is exacerbated since the ends of lips 22 and 24 are generally positioned so that they face the direction of the tidal backflow, thereby increasing the likelihood that the gap 29 will be pried open. The relative thickness of lips 22 and 24 tends to make them stiff and less resilient so that they may be stubborn to return to the sealing engagement position after long periods of outflow in the open position.

Deformation of the saddle due to back pressure and sagging due to the sheer weight of the tide gate valve can also cause gapping. The gapping problem develops in the saddle, and due to thick-walled, unibody construction of the prior art, the gapping is transferred to the bill. Due to the flexible nature of the bill in the present invention and a "stiffness break" between the saddle and bill, any tendency for the saddle to gap open cannot be transferred to the bill. This allows the valve to remain completely sealed.

A tide gate valve 20 according to the present invention addresses problems in the prior art by changing the orientation of lips 22 and 24 and by utilizing thinner, more resilient lips to form the bill of the tide gate valve. The tide gate valve 20 of the present invention, as depicted in FIGS. 4–15, 16 and 18, is also generally comprised of a sleeve, defining a flow-through passage along a first longitudinal axis 31, the sleeve having an intermediate region 14, the upstream end of which is associated with the cylindrical upstream fluid inlet region or cuff 16 mounted on and around the discharge end of conduit 12 and secured by clamps 17. The intermediate region 14 is again shown in its tapered embodiment and includes a second downstream end which is associated with fluid outlet region or bill 26. Bill 26 is comprised of a pair of thinner, more flexible lips 28 and 30. For example, on a 48" valve, each of the lips 28 and 30 would have a thickness only on the order of ³⁄₁₆"–⁵⁄₁₆". The lips 28 and 30 are flattened and have broad planar mating surfaces facing each other, and extend along the entire length of bill 26. It should be noted that in some applications of the present invention, cuff 16 will be replaced by a flange attached directly to intermediate region 14. The invention applies to either version of the upstream fluid inlet region.

Figure 4:
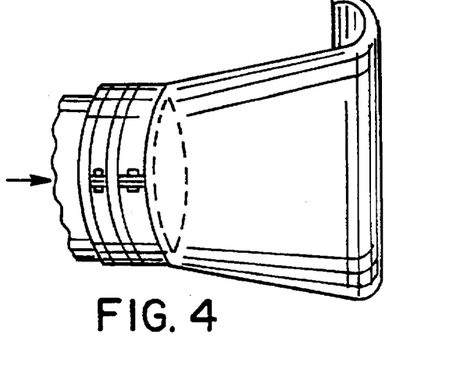
FIG. 4 is a perspective view showing a tide gate valve with a pre-formed curved bill in the closed position, according to the present invention.

Unlike tide gate valves of the prior art, which generally have straight bills so that their lips are always pointing in a general downstream direction, bill 26 is preformed to be curvilinear so that the lips 28 and 30 are pointing away from the general downstream direction of the tide gate valve, when in the closed position shown in FIG. 4. In a preferred embodiment, the bill 26 is pre-formed by vulcanization to form a curve about second axis 33, shown in FIGS. 4 and 14, which is perpendicular to the first longitudinal axis 31 of the tide gate valve 20. When closed, lips 28 and 30 are pointing in a direction roughly 180° away from the downstream direction of the tide gate valve. The Figures herein depict a curvilinear bill having a reverse C-shape, but it will be understood that many other pre-formed bill shapes can achieve the same results as the reverse C, as discussed below.

Figure 5:
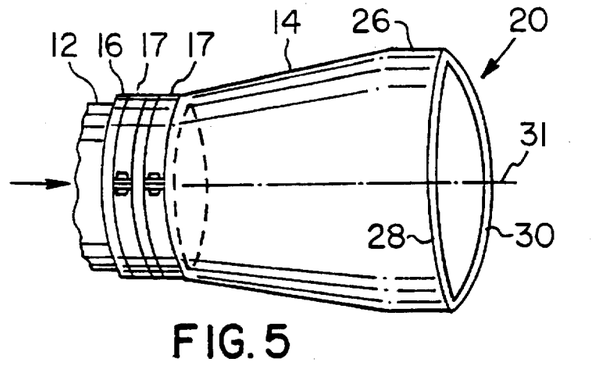
FIG. 5 is a perspective view showing the tide gate valve of FIG. 4 in the open position.

During periods of discharge of effluent from conduit 12, bill 26 will assume the more linear position shown in FIG. 5 which generally corresponds with the longitudinal axis of valve 20. More specifically, during discharge, the valve 20 has an oval-shaped or circular flow-through passage about and along the central longitudinal axis 31 of symmetry, which central axis is also the central axis of the intermediate region 14, fluid inlet region 16 and of conduit 12 itself. In response to a pressure head of a determined minimum magnitude exerted in the downstream direction of the passage such that the pressure inside the passage due to the fluid flow therethrough is greater than the pressure outside the passage, the fluid outlet region 26 straightens and extends roughly along the longitudinal axis 31. Lips 28 and 30 move apart from each other to an open position in which the fluid within the passage may flow past the opened lips to the exterior of the valve.

Conversely, during periods where discharge of effluent from conduit 12 is minimal or nonexistent, fluid outlet region 26, and more specifically, lips 28 and 30 will return to a closed, curved position. Resilience of lips 28 and 30 to return to the closed, curved position is achieved by pre-vulcanizing lips 28 and 30 in a closed, curved position, as discussed in detail below. The curvilinear shape of lips 28 and 30 ensures sealing of the lips during periods of backflow. The curvature also prevents any gapping of the lips during long periods of outflow or prying open of the lips on backflow, should any anomalous gapping be present.

Figure 6:
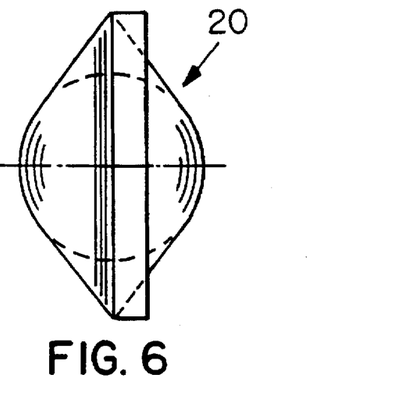
FIG. 6 is an end view of the tide gate valve of FIG. 4.
Figure 7:
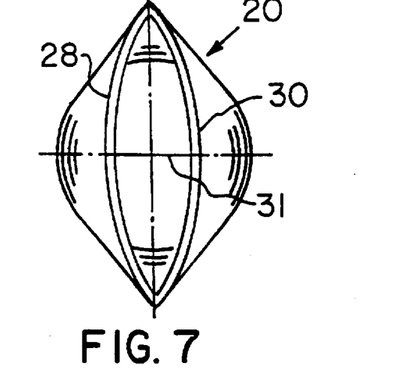
FIG. 7 is an end view showing the tide gate valve of FIG. 6 in the open position.

FIGS. 6 and 7 are front end views of the valve 20, showing the closed and open positions, respectively. Curved bill 26 is shown. The collapsing of lips 28 and 30 upon each other in a curved fashion permits their flattened and broad mating surfaces facing and opposed to each other to form a watertight seal. It is much easier to form a watertight seal with two very thin lips, and it doesn't take as much back pressure to do it as compared to the prior art.

Thus, when the fluid flow ceases, or when a back pressure is exerted in the upstream direction of the passage such that the back pressure is greater by a predetermined amount than the internal pressure, then the curved lips 28 and 30 perform three functions. First, lips 28 and 30 move toward each other and return to the closed, curved position to form a watertight seal along the entire width of bill 26. Because the lips 28 and 30 are relatively thin and made of one or more plies of material containing minimal or no reinforcing supports or members, the lips are extremely flexible and resilient and will reliably return to the curved position. The thin lips also require less energy to open. Second, the pre-vulcanized, curved bill 26 returns the ends of lips 28 and 30 to a position away from the direction of outflow. This prevents the lips from being pried open on backflow. Third, the thin, flexible curved bill design also makes any saddle deformation self contained. Since the bill is very thin and the saddle relatively thicker and less flexible, the deformation cannot transfer into the bill as easily as it did in the prior art. Some of the deformation may transfer, but not enough to make the curve of the bill straighten out or to make the bill invert.

Figure 8:
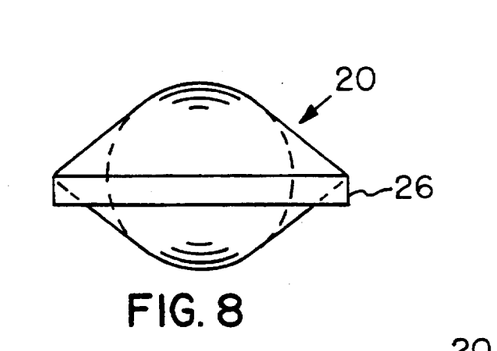
FIG. 8 is an end view showing the tide gate valve according to the present invention mounted with the bill in a horizontal/closed position.
Figure 9:
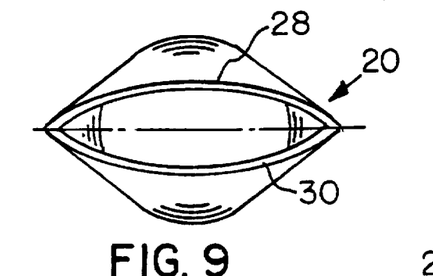
FIG. 9 is an end view showing the tide gate valve of FIG. 8, in the open position.
Figures 12, 13, 14:
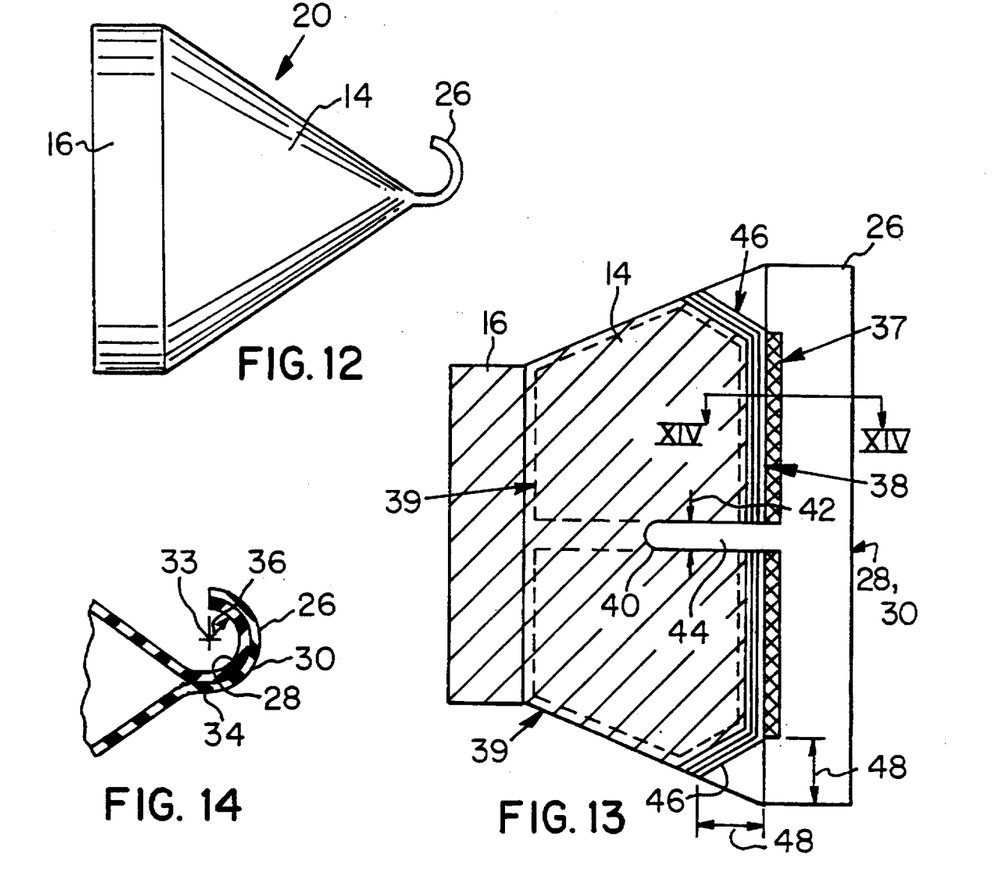
FIG. 12 is a top view of the tide gate valve of FIG. 4.
FIG. 13 is a side view showing internal construction of a tide gate valve according to the present invention.
FIG. 14 is a cross-sectional view, partially broken away, taken along line XIV—XIV of FIG. 13.
Figure 15:
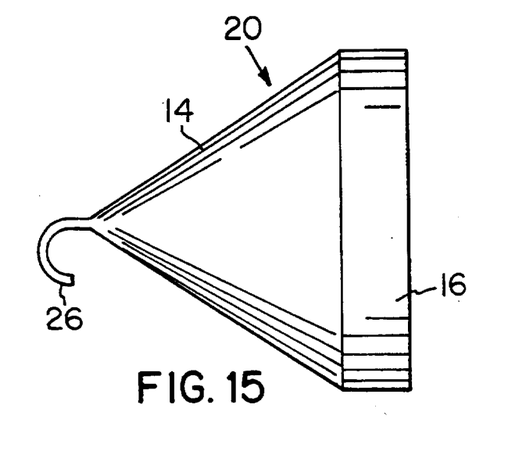
FIG. 15 is a side view of the horizontally mounted tide gate valve of FIG. 8.
Figure 16:
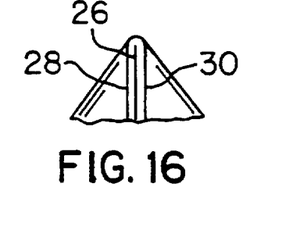
FIG. 16 is an end view, partially broken away, showing relatively thin lips in the upper portion of a bill according to the present invention in the closed position.

While FIGS. 6, 7 and 12 show the lips in a substantially vertical orientation, it is to be understood that this orientation is not the only orientation that can be used with the present invention. Where valve 20 is rotated 90° along its longitudinal axis from the position shown in FIG. 6, lips 28 and 30 will lie in a substantially horizontal plane, as shown in FIGS. 8, 9 and 15. This orientation, by virtue of gravity, gives further assurance that the lips will seal and not invert since the lips will drop and close in the curved position when outflow ceases. With the previous valve construction, having the straight lips, such a horizontal installation was not possible. Horizontal installation may be necessary where there is not sufficient clearance for the bill 26 to be mounted vertically.

Figure 10:
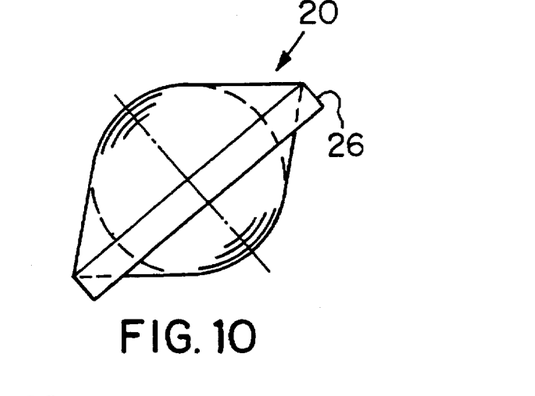
FIG. 10 is an end view showing a tide gate valve according to the present invention mounted in an angled closed position.
Figure 11:
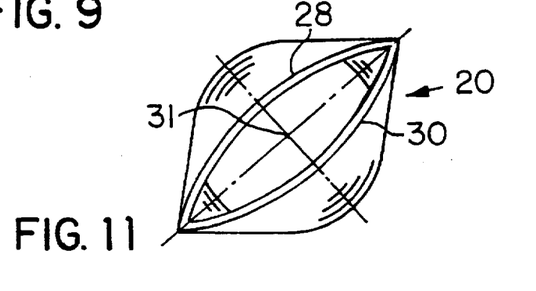
FIG. 11 is an end view showing the tide gate valve of FIG. 10 in the open position.

A valve mounted at an angle with respect to horizontal (approximately 45°) is shown in FIGS. 10 and 11. This orientation may also be preferable for low clearance applications. This orientation also uses gravity to assist in sealing.

Referring now to FIGS. 13 and 14, a detailed description of the construction of a preferred embodiment and best mode of the invention is as follows. Generally, the bulk of the tide gate valve 20 according to the present invention is laid up on a mandrel according to the intended size of the valve, as is the standard practice with the prior art. Particularly, a first layer of unreinforced rubber, also known as "tube", is placed on the mandrel. Thereafter, various fabric reinforced plies of rubber and stiffer reinforcing pads made from a material which is less flexible than the remaining material of the valve are laid on the tube. For example, the bulk of the valve may be made of 30 durometer rubber, whereas the reinforcing pads are made of 90 durometer rubber. For smaller valves in low pressure situations, the stiffening pads may not be necessary.

Additional fabric reinforced plies are placed over the pads and a cover is bound around the entire outer surface of the valve.

As to construction of the curvilinear bill 26, a specialized two-part nesting mandrel may be used, sandwiching the curved bill in between the two. A suitable mandrel for curved bills will be readily constructable by those skilled in the art without undue experimentation upon reading the instant specification. A typical bill 26 according to the present invention is comprised of two lips, each having ⅛ inch tube or unreinforced rubber as its innermost layer, one layer or "ply" of fabric reinforced rubber on top of that and a cover on top of the reinforced ply. A preferred orientation for the curved bill 26, referring to FIG. 14, includes a first straight portion 34 followed by a semicircle which traces an arc defined by a radius 36. The radius is, for example, approximately 3.50 inches for a 48" valve. The radius 36 dimension varies according to the size of the valve. Essentially, bill 26 follows an arc 180° around second axis 33. The length of the straight portion 34 is preferably three inches for the 48" valve, but this dimension varies. For example, the bill 26 could be formed to have an arc of a small radius at the end of a relatively long, straight bill. Generally, any arc defined by the bill which is greater than 0° and up to and including 360° will suffice, as long as the lips are sufficiently thin and flexible. In most applications, the total length of the bill 26 will not exceed sixteen inches.

The bill, saddle portion and cuff, or flange as the case may be, are laid up on the mandrel according to the usual practice and then vulcanized, again according to the usual practice, to form a homogeneous valve 20. The use of a mandrel in the construction procedure necessitates placing fabric reinforced plies 37 so that they extend a certain distance into bill 26 and also extend back into saddle portion 14. This ensures that the lips 28 and 30 of the bill are not pulled away from the main body of the valve 20 when the mandrel is removed from the interior of the valve. Preferably, the fabric reinforced plies 37 extend about three inches into each lip on bill 26 and about eight inches back into saddle portion 14.

FIG. 13 also shows a series of steps 38 formed by the ends of the sheets of rubber used to make up the saddle portion 14 of the valve 20. This stepped configuration ensures that the outer surface of the valve 20 is relatively smooth and that the cover can be tightly wrapped around the valve 20. Furthermore, the stepped configuration eliminates the possibility of any voids inside the construction of the valve 20. The stepped configuration also assists in ensuring that sufficient compression is placed on the rubber plies making up the curved bill 26 during vulcanization, so that the bill 26 will maintain a resilient, curved orientation. These steps 38 are the transition between the thick wall thickness of the saddle to the thin wall thickness of the bill. They help form the aforementioned "stiffness break" between the thick, stiff saddle and the thin, flexible lips. By "stiffness break" it is simply meant to say that the bill is less stiff than the saddle and the transition in stiffness is located at the transition from the saddle to the bill.

Since the lips 28 and 30 are curved and thin to ensure a good seal, the saddle 14 can be further reinforced to resist deformation from back pressure or sagging. Extra stiffening pads 39 of, for example, 90 durometer rubber may be placed in the saddle portion to serve this purpose.

To further increase the ability of the valve 20 to open notwithstanding the presence of pads 39, a hinge 40 is formed on each side of saddle 14. Particularly, the pads 39 which are placed in the saddle portion 14 to reinforce the saddle are cut to form a gap 44 of a predetermined width 42. The length of the gap will generally equal one-half the length of saddle 14. This gap is then filled with strips of neoprene, having very little stiffness. The result is a "hinge" to facilitate opening and closing of the valve 20.

Alternatively, it has been found that a piece of wood or clay may be placed in the gap 44 prior to vulcanization for purposes of supporting the surrounding plies of rubber. After vulcanization the wood or clay could then be pulled out, leaving an open void. In certain cases, this may provide a hinge of equal or better quality as compared to the standard neoprene hinge.

It has also been found advantageous, for valves according to the present invention and otherwise, to form a corner relief 46 on the upper and lower ends of the saddle 14, as shown in FIG. 13. Again, the harder reinforcing pads 39 are cut away to form the corner relief 46. The cut is made according to predetermined dimensions 48, which vary according to the size of the valve. For example, for a twelve inch valve, the dimension 48 would be four inches and the dimension 42 would be one inch. On a forty-two inch valve, the dimension 48 would be eight inches and the dimension 42 would be 2.5 inches. The remaining rubber would then be stepped back, as shown at 38. The corner relief is advantageous because the pressure of rising water against the bottom of the valve 20 compresses the saddle portion 14. Previously, the top and bottom of the valve at the ends of the saddle portion 14 have been too stiff to collapse and seal bill 26 under these conditions. This has resulted in leakage at the top and bottom of the bill 26. The corner relief 46 reduces the stiffness at the top and bottom of the saddle 14, allowing for greater and tighter sealing in lips 28 and 30 at such time as the tide rises and exerts a buoyant force on the bottom of valve 20. The corner relief, acting with the saddle hinges, also reduces the headloss produced on outflow.

As a further alternative to the corner relief 46, hinges similar to that shown at 44 may be placed at the upper and lower end portions of saddle 14. With these hinges in place, in addition to the gap 44, the same advantages of the corner relief may be realized.

FIGS. 16-19 emphasize the distinction between the thinner lips 28 and 30 of the present invention and the thicker lips 22 and 24 according to the prior art. With the thinner lips 28 and 30, the restriction area 27 is not encountered upon opening of the valve. This means that less energy is required to put the valve in the fully open position. The curved orientation of the thinner, more flexible lips 28 and 30 ensures that there is no loss of integrity on backflow and a reduction in the required outflow energy.

Figure 20:
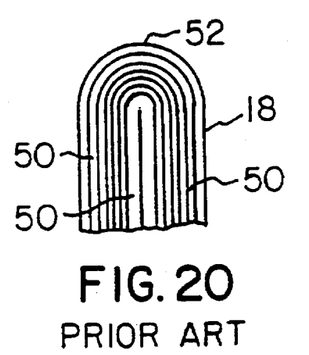
FIG. 20 is a sectional end view, partially broken away, showing inner construction of the prior art bill of FIG. 17.
Figure 21:
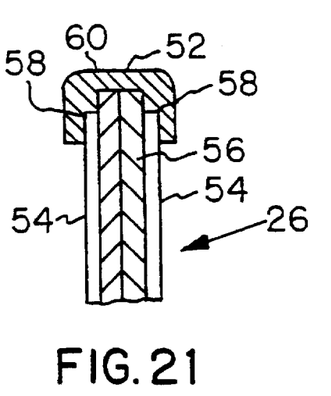
FIG. 21 is a sectional end view, partially broken away, showing inner construction of a bill according to a second embodiment of the present invention.

Referring to FIGS. 20 and 21, a further improvement is disclosed which has application both to curved bills of the present invention and straight bills of the prior art. Particularly, the prior method of constructing the corners of the bills 18 was to wrap individual rubber plies 50 around the corner 52 (see FIG. 20). The same procedure is carried out for both reinforced and unreinforced plies. Referring to FIG. 21, an alternative method for constructing the corner 52 is to create a step by cutting the ends of plies 54 short of the ends of innerplies 56 to form a step 58. A single piece of reinforced or unreinforced rubber 60 may then be wrapped around the steps 58. This would make the bill 26 easier to open as compared to the bill 18 of the prior art.

While the invention has been illustrated and described as embodied in an inversion-resistant, readily openable tide gate valve, it is not intended to be limited to the details shown, since various modifications and structural changes may be made without departing in any way from the spirit of the present invention.

It will be understood by those of ordinary skill in the art that there are several potential designs for a curvilinear bill as described above which, while not identical, are not substantially different from and perform in the same way to achieve the same advantageous results as the preferred embodiment disclosed herein. For example, certain of the advantages of the present invention may be attainable by simply pre-forming a kink or an S-shaped curvature in a bill having thin, flexible lips, as opposed to the C-shaped curvilinear bill disclosed herein. In the case of an S-shaped bill having thin, flexible lips, the lips may not be directed away from the outflow direction of the valve, but the positive sealing of the pre-formed, S-shaped lips may still operate to advantageously seal on backflow or to provide a "stiffness break" to avoid the effects of gapping. Still another variation within the scope of the present invention would be a bill having relatively more flexible lips which are pre-formed to have a coil effect so that they roll back on themselves in the closed position. The term "curvilinear" as used herein is intended to encompass lips which have a curved shape, such as a C-shape or an S-shape, a kinked bill, a helical shape, an angular shape, a zig-zag shape or a corrugated shape.

What is claimed as new and desired to be protected by Letters Patent is set forth in the appended claims.

I claim:

1. An inversion-resistant tide gate valve, comprising:

a sleeve comprised of an elastomeric material and bounding a longitudinally extending, flow-through passage for fluids, said sleeve having an upstream fluid inlet end region mountable on a discharge end of a conduit, said sleeve elongated along a longitudinal first axis of symmetry;

said sleeve having a downstream fluid outlet end region having a backflow preventer comprising a first lip and a second lip opposed to each other, said lips pre-formed to define a curvilinear bill;

said lips being movable from a closed position in which the lips sealingly engage each other and define said curvilinear bill, to an open position in which the lips are located apart from each other in response to a pressure head within said passage and exerted in a direction downstream of said passage to discharge liquid in an outflow direction; and said sleeve having an intermediate region symmetrically arranged relative to said longitudinal axis, said intermediate region merging and being jointly movable with said first and second lips, said lips being thinner and more flexible than said intermediate region.

2. The tide gate valve of claim 1 wherein said bill, when in the closed position, defines a C-shaped arc about a second axis which is perpendicular to said first longitudinal axis.

3. The tide gate valve of claim 1 wherein said lips, when in the closed position, are directed away from said outflow direction.

4. The tide gate valve of claim 1 wherein said bill includes a first straight portion parallel to said longitudinal axis and extending from said intermediate region, followed by a second curved portion.

5. The tide gate valve of claim 3 wherein said lips, when in the closed position, are directed approximately 180° away from said outflow direction.

6. The tide gate valve of claim 1 wherein each of said lips is formed by a layer of an unreinforced elastomer, a layer of a reinforced elastomer and a cover.

7. The tide gate valve of claim 1 wherein said lips are pre-formed to define a curvilinear bill by vulcanization.

8. The tide gate valve of claim 1 wherein said bill forms an arc which is greater than 0° and less than or equal to 360° about a second axis perpendicular to said first axis.

9. The tide gate valve of claim 1 wherein said intermediate region contains a plurality of reinforcing pads, said pads having a stepped construction to provide a thickness and flexibility transition between said intermediate portion and said bill.

10. The tide gate valve of claim 1 wherein said intermediate portion includes a hinge to facilitate opening and closing of said valve.

11. The tide gate valve of claim 1 wherein said intermediate region is comprised of a plurality of reinforcing pads, each reinforcing pad having a corner relief to facilitate sealing of the lips and reduce stiffness at the outer edges of the intermediate portion.

12. The tide gate valve of claim 1 including at least one reinforced elastomer layer extending from said bill into said intermediate portion to prevent said bill from tearing away from said intermediate portion.

13. The tide gate valve of claim 1 wherein said bill is vertically oriented.

14. The tide gate valve of claim 1 wherein said bill is horizontally oriented.

15. The tide gate valve of claim 1 wherein said bill is oriented at an angle to horizontal which is between 0° and 90°.

16. The tide gate valve of claim 1 wherein each of said lips in said bill is comprised of two elastomer layers, the outermost layer cut short of the innermost layer at its lateral edge, to form a step, with a third elastomer layer overlapping each of said steps to form a corner.

17. An inversion-resistant tide gate valve, comprising:

a sleeve comprised of a plurality of layers of reinforced and unreinforced elastomeric materials, said sleeve bounding a longitudinally extending, flow-through passage for fluids, said sleeve having an upstream fluid inlet end region mountable on a discharge end of a conduit, said sleeve elongated along a longitudinal axis of symmetry;

said sleeve having a downstream fluid outlet end region having a backflow preventer comprising a first lip and a second lip opposed to each other and pre-formed to define a curvilinear bill;

said lips being movable from a closed position in which the lips form a C-shaped arc and sealingly engage each other, to an open position in which the lips are located apart from each other in response to a pressure head within said passage and exerted in a direction downstream of said passage to discharge liquid in an outflow direction;

said sleeve having an intermediate region symmetrically arranged relative to said longitudinal axis, said intermediate region merging and being jointly movable with said first and second lips;

said lips comprised of at least one layer of an unreinforced elastomeric material, said lips being thinner and more flexible than said intermediate region, said lips when in the closed position being directed away from said outflow direction.

18. The tide gate valve of claim 17 wherein said intermediate region contains one or more reinforcing pads comprised of a material which is harder than the remainder of said elastomeric material in said sleeve, thereby imparting stiffness to said intermediate region.

19. The tide gate valve of claim 18 wherein said intermediate region contains a plurality of said reinforcing pads, said pads stepped to form a transition in thickness and flexibility between said intermediate region and said bill.

20. The tide gate valve of claim 18 including a hinge in said intermediate region.

21. The tide gate valve of claim 18 including a corner relief on said reinforcing pads.

22. The tide gate valve of claim 17 wherein each of said lips is formed by a layer of an unreinforced elastomer, a layer of a reinforced elastomer and a cover.

23. The tide gate valve of claim 17 including at least one reinforced elastomer layer extending from said bill into said intermediate portion to prevent said bill from tearing away from said intermediate portion.

24. The tide gate valve of claim 17 wherein each of said lips in said bill is comprised of two elastomer layers, the outermost layer cut short of the innermost layer at its lateral edge, to form a step, with a third elastomer layer overlapping each of said steps to form a corner.

25. The tide gate valve of claim 17 wherein said lips are pre-formed to define a curvilinear bill by vulcanization.

* * * * *